United States Patent
Hiroki

(10) Patent No.: US 7,151,746 B2
(45) Date of Patent: Dec. 19, 2006

(54) WIRELESS DATA COMMUNICATION SYSTEM

(75) Inventor: Shigeru Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/209,357

(22) Filed: Jul. 31, 2002

(65) Prior Publication Data

US 2003/0026248 A1     Feb. 6, 2003

(30) Foreign Application Priority Data

Aug. 1, 2001   (JP) .............................. 2001-234090

(51) Int. Cl.
*H04L 12/26* (2006.01)
(52) U.S. Cl. ..................... 370/230; 370/235
(58) Field of Classification Search ................ 370/230, 370/235, 352
See application file for complete search history.

(56) References Cited

U.S. PATENT DOCUMENTS

| | | | |
|---|---|---|---|
| 5,969,629 A | 10/1999 | Tsuchida | 340/825.06 |
| 6,055,416 A | 4/2000 | Hachimura | 455/70 |
| 6,208,620 B1 | 3/2001 | Sen et al. | |
| 6,473,399 B1 * | 10/2002 | Johansson et al. | 370/229 |
| 6,757,245 B1 * | 6/2004 | Kuusinen et al. | 370/230 |
| 2002/0082033 A1 * | 6/2002 | Lohtia et al. | 455/517 |

* cited by examiner

Primary Examiner—Hassan Kizou
Assistant Examiner—Albert T. Chou
(74) Attorney, Agent, or Firm—Morgan & Finnegan, LLP

(57) ABSTRACT

When a CRC error is detected by a PIAFS protocol controller during data transferring, the PIAFS protocol controller starts a resynchronization sequence and informs a TCP/IP protocol controller of starting of resynchronization. In the TCP/IP protocol controller, when the starting of resynchronization is informed after a retransmission timer is started, the retransmission timer is stopped temporarily, and, in a condition that the retransmission timer is stopped temporarily, completion of resynchronization is informed from the PIAFS protocol controller, the retransmission timer which was stopped temporarily is re-started.

13 Claims, 9 Drawing Sheets

WIRELESS DATA COMMUNICATION SYSTEM

BACKGROUND OF THE INVENTION

1. Field of the Invention

The present invention relates to a wireless data communication system.

2. Description of Related Art

Nowadays, when connected to an internet, generally, a TCP (transmission control protocol) is used as a transport layer protocol. The TCP is provided with a retransmission function in consideration of a case where a packet may be lost on a transmission line. In the TCP, although a retransmission timer is started when the packet is transmitted to a recipient and the retransmission timer is stopped when a confirmation response was received from the recipient, the packet is re-transmitted if the confirmation response is not received and the retransmission timer is timed out.

Further, when a terminal is connected to the internet through a public network, a PPP (point-to-point protocol) is generally used as a data link layer protocol which is a lower order layer of a TCP/IP (transmission control protocol/internet protocol). In the PPP, the data link is monitored by transmitting echo request and by receiving echo reply from the recipient. Upon transmitting the echo request, a watch timer is started, and the link of the PPP is disconnected if the echo reply is not received until the watch timer is timed out.

In this way, although a protocol stack of the TCP/IP or PPP is used when connected to the internet from the terminal through the public network, when the terminal is a wireless terminal, by using a data transfer protocol as a lower order layer of the TCP/IP or PPP protocol, loss of the data packet due to an error inherent to wireless communication is avoided.

Since the TCP/IP and PPP assume that wire connection is used, vergence of the network is considered with respect to the loss of the data packet in the TCP. Whereas, in the wireless data transfer protocol, occurrence of a burst error inherent to the wireless communication and hand-over must be considered. As a representative wireless data transfer protocol, for example, there is a PIAFS (PHS internet access forum standard) data transfer protocol used in a PHS (personal handyphone system).

The PIAFS data transfer protocol will now be explained with reference to FIG. 7. FIG. 7 is a view showing a frame format in the PIAFS data transfer protocol.

In the PIAFS data transfer protocol, data is transferred with a frame format of 640 bits as shown in FIG. 7. The frame is provided with a plurality of areas 900 to 905.

An area 900 is an area in which a frame identification element (FI) is stored. The frame identification element (FI) serves to identify either one of a negotiation frame, a synchronous frame, a control frame or a data frame. The negotiation frame is a frame used in negotiation for determining whether or not the PIAFS data transfer protocol is used. The synchronous frame is used to effect synchronization of the data frame of 640 bits in the PIAFS data transfer protocol. The control frame is used in transceiver of control data such as transceiver of various parameters of the data transfer protocol. The data frame is used for transferring the data.

As the format of the data frame, there is a format shown in FIG. 7, and, in this case, a transmission frame number (FFI) is stored in an area 902 and a request frame number (FBI) is stored in an area 902. The transmitting side continues to transmit a corresponding transmission frame so long as confirmation indicated by the request frame number (FBI) is not received.

A data length (byte number) transmitted by the frame is stored in an area 903. Data transmitted by the frame is stored in an area 904. A calculation result obtained by CRC 32 of the frame in a frame check sequence is stored in an area 905. The calculation result is stored in the transmitting side.

In the PIAFS data transfer protocol, the calculation is effected by the CRC 32 of the received frame, and the calculation result is compared with the calculation result stored in the area 905, and it is judged whether there is an error in the data received from the recipient. As a result of the judgement, if both do not coincide with each other, the received frame is discarded. Hereinafter, the case where the calculation result obtained by the CRC 32 is referred to as a CRC error.

If the wireless condition is worsened or if the hand-over occurs, the CRC error is generated continuously. In the PIAFS data transfer protocol, if the error occurs continuously for 20 frames in case of 32 Kbps data transmission and for 40 frames in case of 64 Kbps data transmission, it is regarded as out-of synchronization, and a resynchronization sequence is started. If resynchronization is established within 15 seconds at the maximum, the data transfer based on the PIAFS is continued.

Next, a system which can be connected to the internet by using a wireless data terminal will be explained with reference to FIG. 8.

As shown in FIG. 8, a wireless data terminal 701 includes a wireless controller 801 for controlling the PHS, a PIAFS protocol controller 805, a PPP protocol controller 806 and a TCP/IP protocol controller 807. Although not shown, the wireless data terminal 701 an application controller for controlling applications such as an electronic mail, a web browser and the like, as a higher order of the TCP/IP protocol controller 807.

Next, a sequence in transmitting the TCP/IP data packet from the wireless data terminal 701 will be explained. FIG. 8 is a view showing a sequence effected when the TCP/IP data packet is transmitted from the wireless data terminal 701 to a server 106 through a base station 102 and an access point 104. Incidentally, the base station 102 and the access point 104 are interconnected via the public network, and the access point 104 and the server 106 are interconnected via the internet.

It is assumed that the wireless data terminal 701 and the access point 104 are presently connected to the base station 102 via the public network. In this case, the PIAFS link and PPP link are established between the PIAFS protocol controller 805 of the wireless data terminal 701 and the access point 104.

As shown in FIG. 8, the TCP/IP protocol controller 807 transmits a data packet 811 to the PPP protocol controller 806. Upon occurring such transmission, the retransmission timer is started. The PPP protocol controller 806 which received the TCP/IP data packet 811 from the TCP/IP protocol controller 807 adds PPP header to the TCP/IP data packet 811 and transmits a PPP packet 812 to the PIAFS protocol controller 805. The PIAFS protocol controller 805 divides the PPP packet into data frames 813A to 813D each having bytes smaller than 73 bytes and transmits them to the access point 104 through the public network.

In the access point 104, the divided data frames 813A to 813D are reconstructed to restore the PPP packet and removes the PPP header and transmits it to the internet as a TCP/IP data frame 814.

When the server 106 receives the TCP/IP data frame 814 including its own address, the server transmits a TCP/IP confirmation response packet 821. The TCP/IP confirmation response packet 821 reaches the wireless data terminal 701 through a route 822 opposite to a route through which the TCP/IP data packet is transmitted. When the TCP/IP protocol controller 807 of the wireless data terminal 701 receives a TCP/IP confirmation response packet 824, the retransmission timer which was started upon transmission of the data packet is stopped.

If the confirmation response packet 824 is not received before the retransmission timer is timed out, the transmitted data packet 811 is retransmitted.

As mentioned above, in case of a moving communication network such as PHS, the CRC error may occur continuously in the PIAFS data transfer protocol if the wireless condition is worsened or if the hand-over occurs. If the CRC error occurs continuously, the PIAFS data transfer protocol starts the resynchronization sequence. However, since reestablishment of synchronization in the resynchronization sequence takes 15 seconds at the maximum, the following inconvenience will occur.

Now, such inconvenience will be explained with reference to FIG. 9. FIG. 9 is a sequence view when the inconvenience occurs during the transmission of the TCP/IP data transmission in the system shown in FIG. 8.

Although the TCP/IP data packet 811 (PPP packet 812) sent from the TCP/IP protocol controller 807 to the PIAFS protocol controller 805 through the PPP protocol controller 806 is divided into the PIAFS data frames 813A to 813D which are in turn transmitted, if the resynchronization sequences 831, 832 are started during the transmission of the data frames 813A to 813D, the data frames (813C, 813D) are not transmitted until the resynchronization sequences are finished.

Accordingly, the time when the TCP/IP data packet reaches the server 106 is delayed by a time amount corresponding to the resynchronization establishing time, in comparison with the case where the resynchronization sequences 831, 832 are not started during the transmission of the data frames.

Further, also when the confirmation response packet 821 is transferred from the server 106, if the hand-over (833) occurs between the wireless data terminal 101 and the base station 102, reach of the confirmation response packet 824 to the TCP/IP protocol controller 807 will be further delayed.

During the time period in which such TCP/IP packet is being transferred, if the resynchronization sequences are started between the wireless data terminal 101 and the base station 102, since the total time period of the resynchronization sequences are added to the time period from when the TCP/IP data packet is transmitted by the TCP/IP protocol controller 807 to when the confirmation response packet is received, in comparison with the normal case, the possibility of the fact that the retransmission timer is timed out is increased. If the retransmission timer is timed out, retransmission (811R) of the TCP/IP data packet is effected.

That is to say, in case of the conventional system, during the time period in which such TCP/IP packet is being transferred, if the hand-over occurs between the wireless data terminal 101 and the base station 102, even when the wire network prepared for the TCP/IP is completely normal, since the retransmission timer is timed out, the transmission of the data packet is effected.

Further, in the PPP protocol controller 206, although echo request is transmitted and waits echo replay with respect to recipient of the PPP link in order to watch or monitor the link, even when the resynchronization sequence is started during the transferring of the echo request and echo reply, similarly, the PPP watch timer may be timed out, and, if the watch timer is timed out, the link will be interrupted meaningless.

SUMMARY OF THE INVENTION

An object of the present invention is to appropriately set a time period during when waits response from a recipient, in a higher order layer protocol, regardless of a condition of a wireless data transfer protocol which is a lower order layer protocol.

Another object of the present invention is to prevent frequent occurrence of data transmission effected by the higher order layer protocol when the lower order layer protocol is the wireless data transfer protocol.

A further object of the present invention is to prevent frequent occurrence of interruption of a link effected by the higher order layer protocol when the lower order layer protocol is the wireless data transfer protocol.

The other objects, advantages and features of the present invention will be apparent from the following detailed explanation of embodiments of the present invention.

DETAILED DESCRIPTION OF THE PREFERRED EMBODIMENTS

The present invention will now be explained in connection with embodiments thereof with reference to the accompanying drawings.

Figure 1:
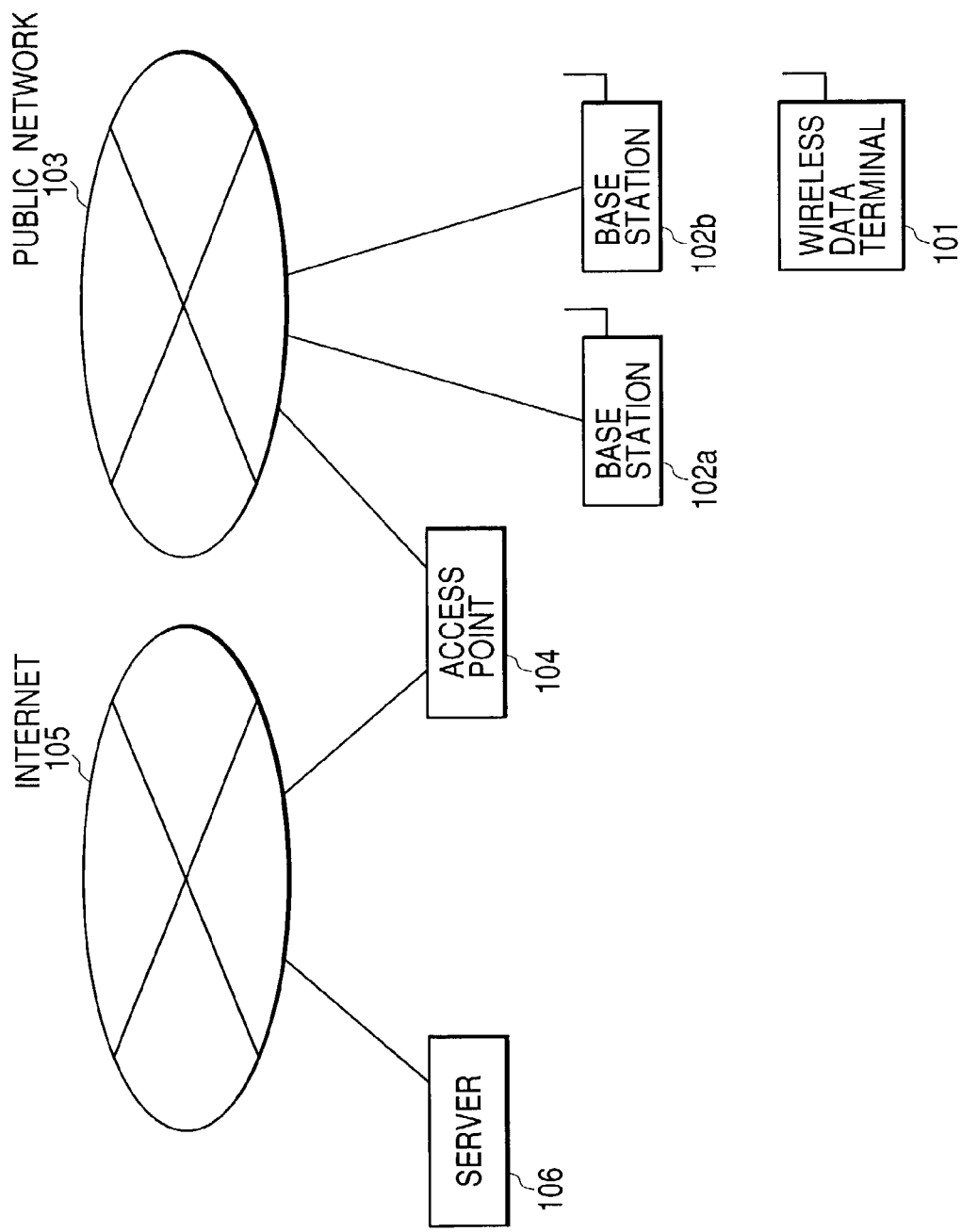
FIG. 1 is a constructural view of a system using a wireless data communication apparatus according to a first embodiment of the present invention.
Figure 2:
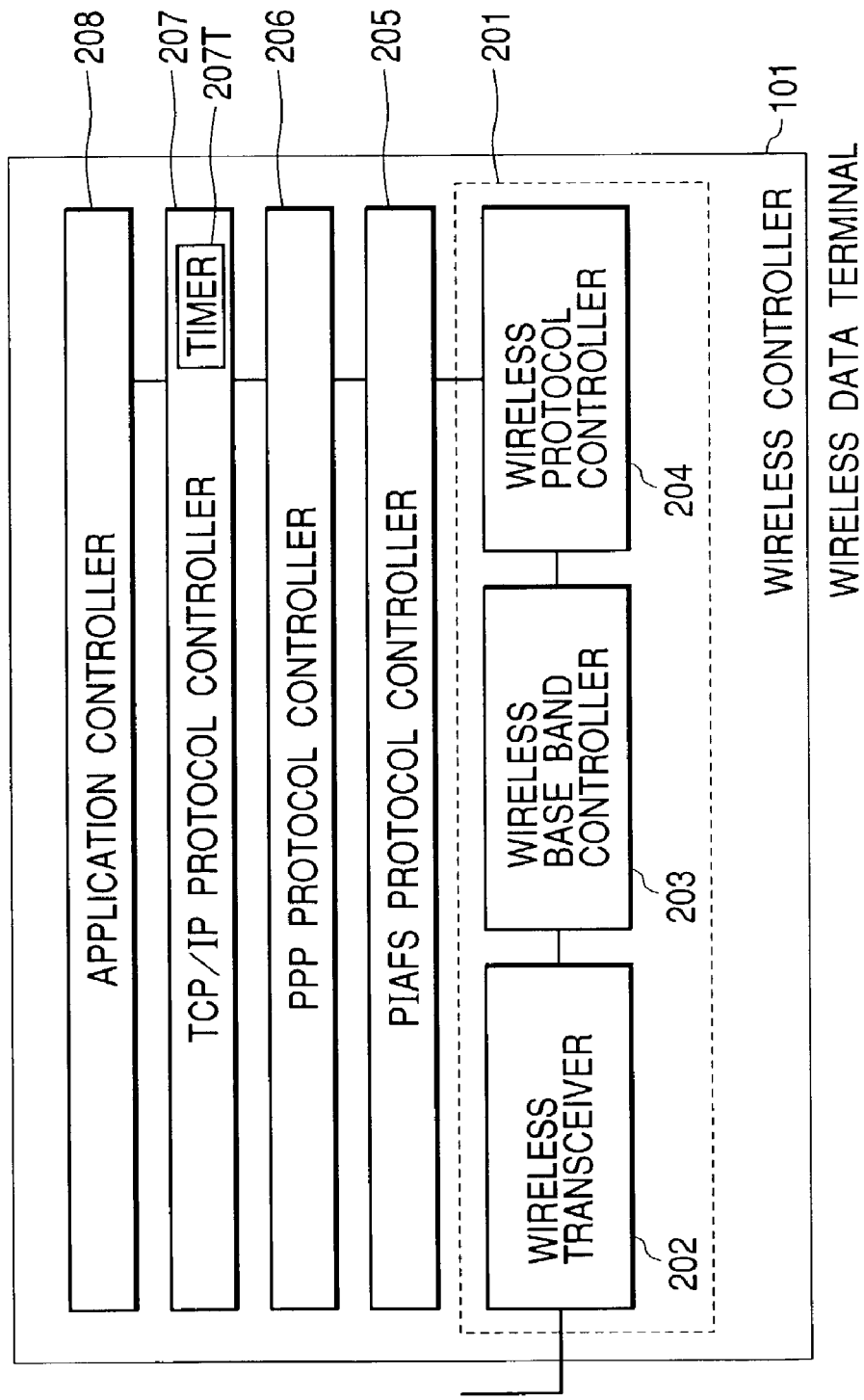
FIG. 2 is a block diagram showing a construction of the wireless data communication apparatus shown in FIG. 1.

FIG. 1 is a constructural view of a system using a wireless data communication apparatus according to a first embodiment of the present invention, and FIG. 2 is a block diagram showing a construction of the wireless data communication apparatus shown in FIG. 1.

The system shown in FIG. 1 includes a wireless data terminal 101 comprised of a PHS having a wireless data communicating function, base stations 102a, 102b for PHS, a public network 103, an access point 104 by which the wireless data terminal 101 can be connected to an internet 105 through the public network 103, and a server 106 for a web and an electronic mail. Hereinafter, the base stations 102a, 102b are referred to as a base station 102 correctively.

As shown in FIG. 2, the wireless data terminal 101 includes a wireless controller 201 for controlling the PHS, a PIAFS protocol controller 205, a PPP protocol controller 206, a TCP/IP protocol 207 and an application controller 208 for controlling applications such as an electronic mail, a web browser and the like. The wireless controller 201 includes a wireless transceiver 202, a wireless base band controller 203 and a wireless protocol controller 204. Incidentally, a wireless data transfer protocol used in the wireless data terminal 101 is not limited to a PIAFS data transfer protocol for PHS, but may be other wireless data transfer protocols.

The PIAFS protocol controller 205 serves to control a data synchronization communication protocol and to start resynchronization sequence when the CRC error (factor for interrupting the data transferring) occurred continuously for 20 frames in case of 32 Kbps data transmission and for 40 frames in case of 64 Kbps data transmission during the data transferring of the data frames is detected and inform the TCP/IP protocol controller 207 (as the higher order layer protocol controller) of the starting of the resynchronization. Further, when the resynchronization (factor for restarting the data transferring) is established by the resynchronization sequence, the PIAFS protocol controller 205 informs the TCP/IP protocol controller 207 of completion of the resynchronization.

The TCP/IP protocol controller 207 controls the TCP/IP protocol as the transport layer protocol. The TCP/IP protocol has a function for starting a retransmission timer 207T as the data packet is sent and for effecting retransmission depending upon whether the confirmation response packet for the data packet is received before the retransmission timer 207T is timed out. When the TCP/IP protocol controller 207 receives the information regarding the starting of the resynchronization from the PIAFS protocol controller 205 as the lower order layer protocol controller, the TCP/IP protocol controller stops the retransmission timer 207T temporarily. Further, when TCP/IP protocol controller 207 receives the information regarding the completion of the resynchronization from the PIAFS protocol controller 205, the TCP/IP protocol controller re-starts the retransmission timer 207T which was stopped temporarily.

Figure 3:
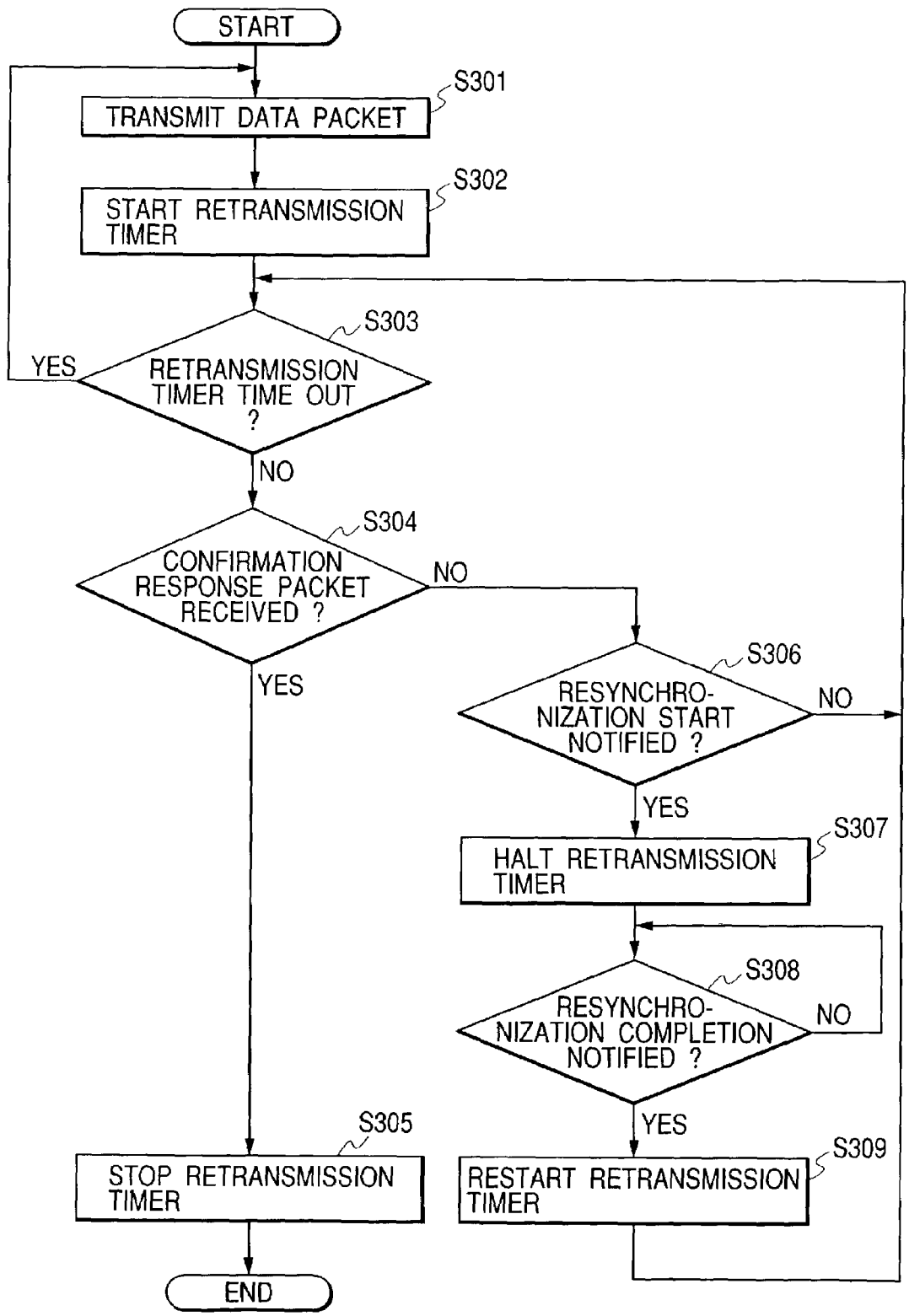
FIG. 3 is a flow chart showing an operation of a TCP/IP protocol controller 207 of a wireless data terminal 101 of FIG. 1.
Figure 4:
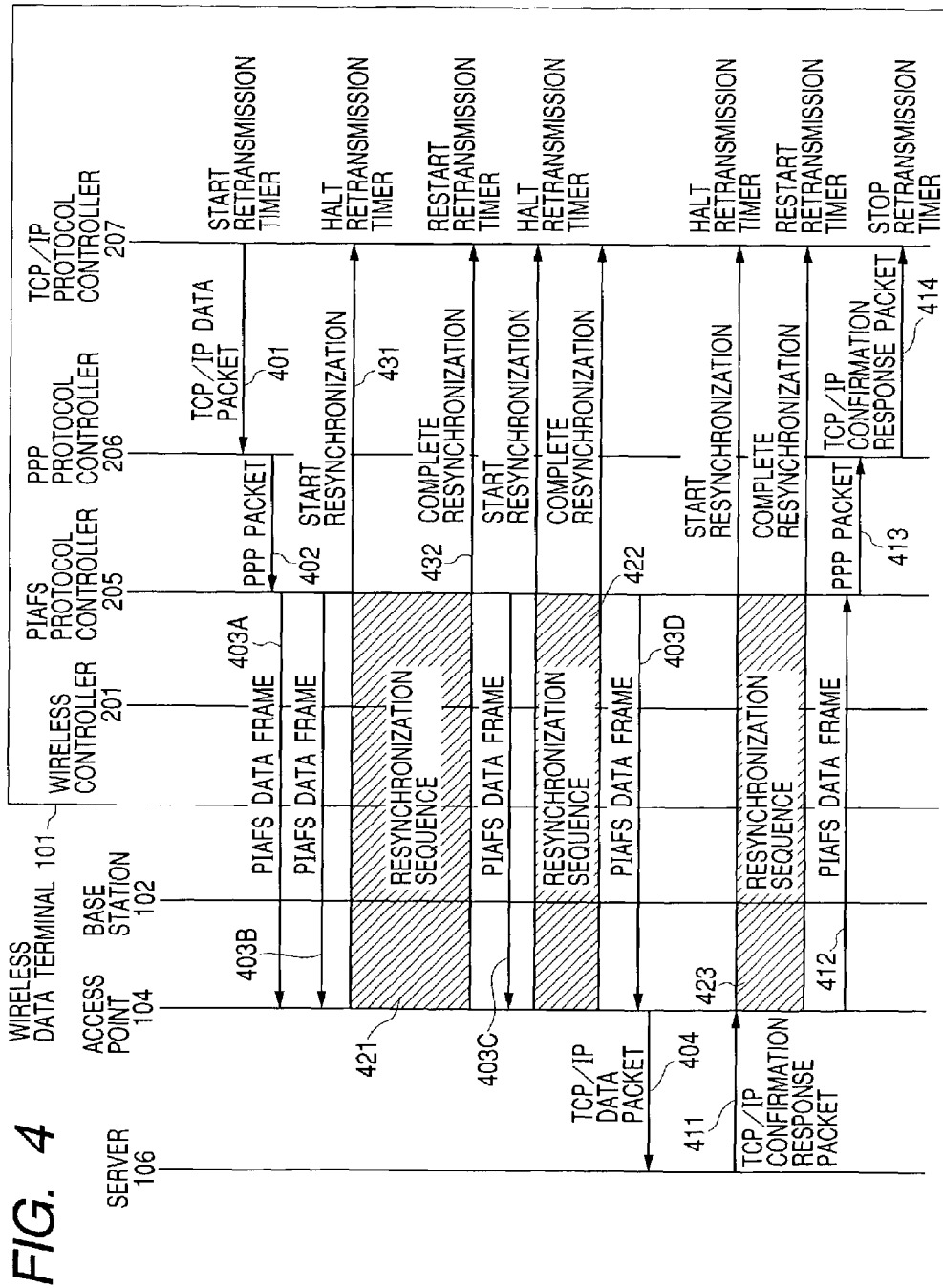
FIG. 4 is a view showing a sequence when a data packet is transmitted from the wireless data terminal 101 of FIG. 1.

Next, an operation for sending the data packet in the wireless data terminal 101 will be explained with reference to FIGS. 3 and 4. FIG. 3 is a flow chart showing the operation of the TCP/IP protocol controller 207 of the wireless data terminal 101, and FIG. 4 is a view showing a sequence when the data packet is transmitted from the wireless data terminal 101. When the TCP/IP protocol controller 207 is constituted by a memory storing a program and a computer for reading out such program and operated thereby, FIG. 3 represents a part of the program.

When the wireless data terminal 101 and the access point 104 are connected to the base station 102a or 102b via the public network 103, as shown in FIG. 4, a PIAFS link and a PPP link are established between the PIAFS protocol controller 205 of the wireless data terminal 101 and the access point 104.

As shown in FIGS. 3 and 4, the TCP/IP protocol controller 207 transmits a data packet 401 to the PPP protocol controller 206 (step S301) and starts the retransmission timer 207T upon such transmission (step S302).

The PPP protocol controller 206 which received the TCP/IP data packet 401 from the TCP/IP protocol controller 207 adds PPP header to the TCP/IP data packet 401 and transmits a PPP packet 402 to the PIAFS protocol controller 205. The PIAFS protocol controller 205 divides the PPP packet 402 into data frames 403A to 403D each having bytes smaller than 73 bytes and transmits them to the access point 104 through the public network 103.

In the access point 104, the divided data frames 403A to 403D are reconstructed to restore the PPP packet and further removes the PPP header and transmits it to the internet 105 as a TCP/IP data frame 404. That is to say, PIAFS data frame 403 is transmitted from the PIAFS protocol controller 205 to the access point 104.

In the CRC error (factor for interrupting the data transferring) in the 32 Kbps data transmission or the 64 Kbps data transmission is detected by the PIAFS protocol controller 205, the PIAFS protocol controller 205 starts a resynchronization sequence 421 and informs the TCP/IP protocol controller 207 of starting of resynchronization 431.

In the TCP/IP protocol controller 207, after the retransmission timer 207T is started, when the starting of resynchronization 431 is informed (step S306), the retransmission timer 207T is stopped temporarily (step S307). In a condition that the retransmission timer 207T is stopped temporarily, when completion of resynchronization 432 is informed from the PIAFS protocol controller 205 (step S308), the retransmission timer 207T which was stopped temporarily is re-started (step S309). In the illustrated embodiment, in the step S309, the retransmission timer 207T starts clock from a timer value temporarily stopped. Accordingly, the retransmission timer 207T is extended by resynchronization time period. According to a first alteration, in the step S309, the retransmission timer 207T re-starts clock from an initial value. According to a second alteration, in the step S309, the retransmission timer 207T is started to count time T1, and, in the step S307, the retransmission timer 207T is started to count time T2 (>T1), and the program goes to a step S303, where it is waited until T2 is timed out. An example of the T2 is 15 seconds (limit of the resynchronization). In the second alteration, information of the completion of resynchronization is not required.

Upon the completion of resynchronization, the PIAFS protocol controller 205 transmits the data frames 403B, 403C to the access point 104. Here, while an example that, when the TCP/IP protocol controller 207 receives the starting of resynchronization from the PIAFS protocol controller 205, the time for waiting the arrival of the confirmation response packet is extended was explained, the TCP/IP protocol controller 207 can extend the time for waiting the arrival of the confirmation response packet by using information regarding a reception error in place of the starting of resynchronization.

When the server 106 receives the TCP/IP data packet 404 (including its own address) reconstructed by the access point 104, the server transmits a TCP/IP confirmation response packet 411. That is to say, the TCP/IP packet 401 transmitted form the TCP/IP protocol controller 207 is transmitted to the server 106. The TCP/IP confirmation response packet 411 reaches the wireless data terminal 101 through a route (412) opposite to a route through which the TCP/IP data packet is transmitted. In the wireless data terminal 101, the PIAFS protocol controller 205 converts the PIAFS data frame 412 into a PPP packet 413 and the PPP protocol controller 206 converts the PPP packet 413 into a TCP/IP confirmation response packet 414.

When the TCP/IP protocol controller 207 receives the TCP/IP confirmation response packet 414 (step S304), the TCP/IP protocol controller 207 completely stops the retransmission timer 207T which was started upon transmission of the data packet 401 (step S305). In the illustrated embodiment, when the confirmation response packet is received after the retransmission timer 207T is started upon transmission of the data packet or when the confirmation response packet is received after the retransmission timer 207T which was stopped temporarily is re-started, the retransmission timer 207T is stopped completely.

Further, if the retransmission timer 207T is timed out before the TCP/IP confirmation response packet 414 is received (step S303), the data packet 401 is re-transmitted (step S301) and the retransmission timer 207T is started (step S302).

In this way, in the illustrated embodiment, since, if the CRC error occurs continuously due to the worsening of the wireless condition or the occurrence of the hand-over between the wireless data terminal 101 and the base station 102, the resynchronization sequence is started, and, during this resynchronization sequence, the retransmission timer for TCP/IP is stopped temporarily, the retransmission of the packet caused by delay generated during non-transmission time period of the wireless data transfer protocol, other than loss of the TCP/IP packet inherently considered by the TCP in the vergence of the network, can be avoided.

Figure 5:
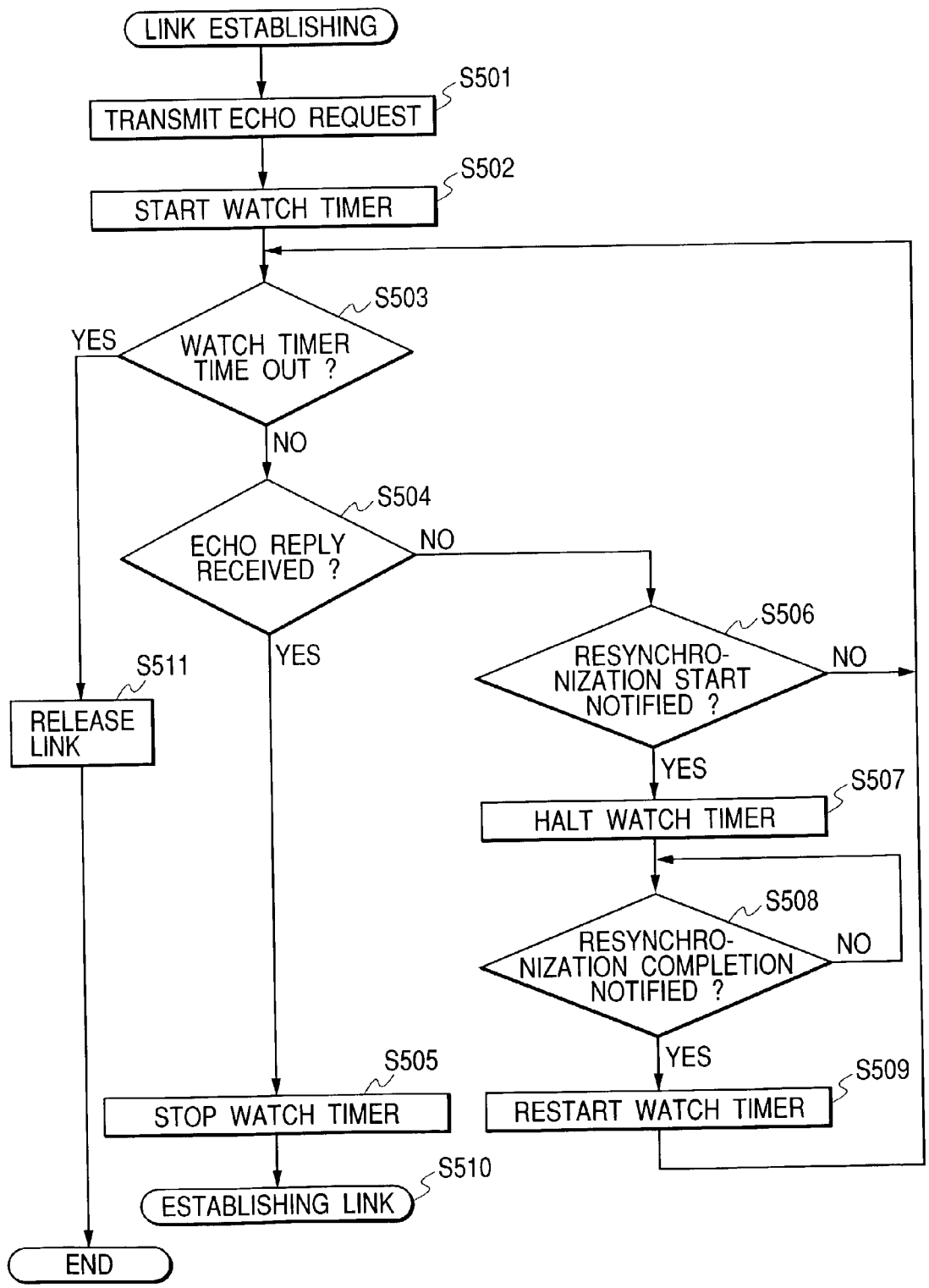
FIG. 5 is a flow chart showing an operation of a PPP protocol controller of a wireless data communication apparatus according to a second embodiment of the present invention.

Next, a second embodiment of the present invention will be explained with reference to FIG. 5. FIG. 5 is a flow chart showing an operation of a PPP protocol controller of a wireless data communication apparatus according to a second embodiment of the present invention. The second embodiment has the same construction as the above-mentioned first embodiment, and, thus, in the following description, the same reference numerals will be used. When the PPP protocol controller 205 is constituted by a memory storing a program and a computer for reading out such program and operated thereby, FIG. 5 represents a part of the program.

When the CRC error (factor for interrupting the data transferring) occurred continuously for 20 frames in case of 32 Kbps data transmission and for 40 frames in case of 64 Kbps data transmission during the data transferring of the data frames is detected, the PIAFS protocol controller 205 starts the resynchronization sequence and informs the PPP protocol controller 206 (as the higher order layer protocol controller) of the starting of the resynchronization. When the resynchronization (factor for restarting the data transferring) is established by the resynchronization sequence, the PIAFS protocol controller 205 informs the PPP protocol controller 206 of the completion of the resynchronization.

The PPP protocol controller 206 serves to control the PPP protocol which is a data link protocol.

As shown in FIG. 5, in the PPP protocol controller 206, when echo request is transmitted (step S501), the watch timer is started (step S502). After the echo request is transmitted and the watch timer is started, if the starting of the resynchronization is informed from the PIAFS protocol controller 205 (step S506), the watch timer is stopped temporarily (step S507).

In a condition that the watch timer is stopped temporarily, when completion of resynchronization is informed from the PIAFS protocol controller 205 (step S508), the watch timer which was stopped temporarily is re-started (step S509). In the illustrated embodiment, in the step S509, the watch timer starts clock from a timer value temporarily stopped. Accordingly, the watch timer is extended by resynchronization time period. According to a first alteration, in the step S509, the watch timer re-starts clock from an initial value. According to a second alteration, in the step S502, the watch timer is started to count time T3, and, in the step S507, the watch timer is started to count time T4 (>T3), and the program goes to a step S503, where it is waited until T4 is timed out. An example of the T4 is 15 seconds (limit of the resynchronization). In the second alteration, information of the completion of resynchronization is not required. Here, while an example that, when the PPP protocol controller 206 receives the starting of resynchronization from the PIAFS protocol controller 205, the time for waiting the arrival of the echo reply is extended was explained, the PPP protocol controller 206 can extend the time for waiting the arrival of the echo reply by using information regarding a reception error in place of the starting of resynchronization.

Further, if the echo reply is received in the time period from when the transmission of the echo request is started to when the watch timer is timed out (step S504), the watch timer is stopped completely (step S505), and the link establishment is continued (step S510).

If the watch timer is timed out before the echo reply is received (step S503), the data link is released (step S511).

In this way, in the illustrated embodiment, since, if the CRC error occurs continuously due to the worsening of the wireless condition or the occurrence of the hand-over between the wireless data terminal 101 and the base station 102, the resynchronization sequence is started, and, during this resynchronization sequence, the retransmission timer for PPP is stopped temporarily, the meaningless interruption of the data link caused by delay generated during non-transmission time period of the wireless data transfer protocol can be avoided.

Figure 6:
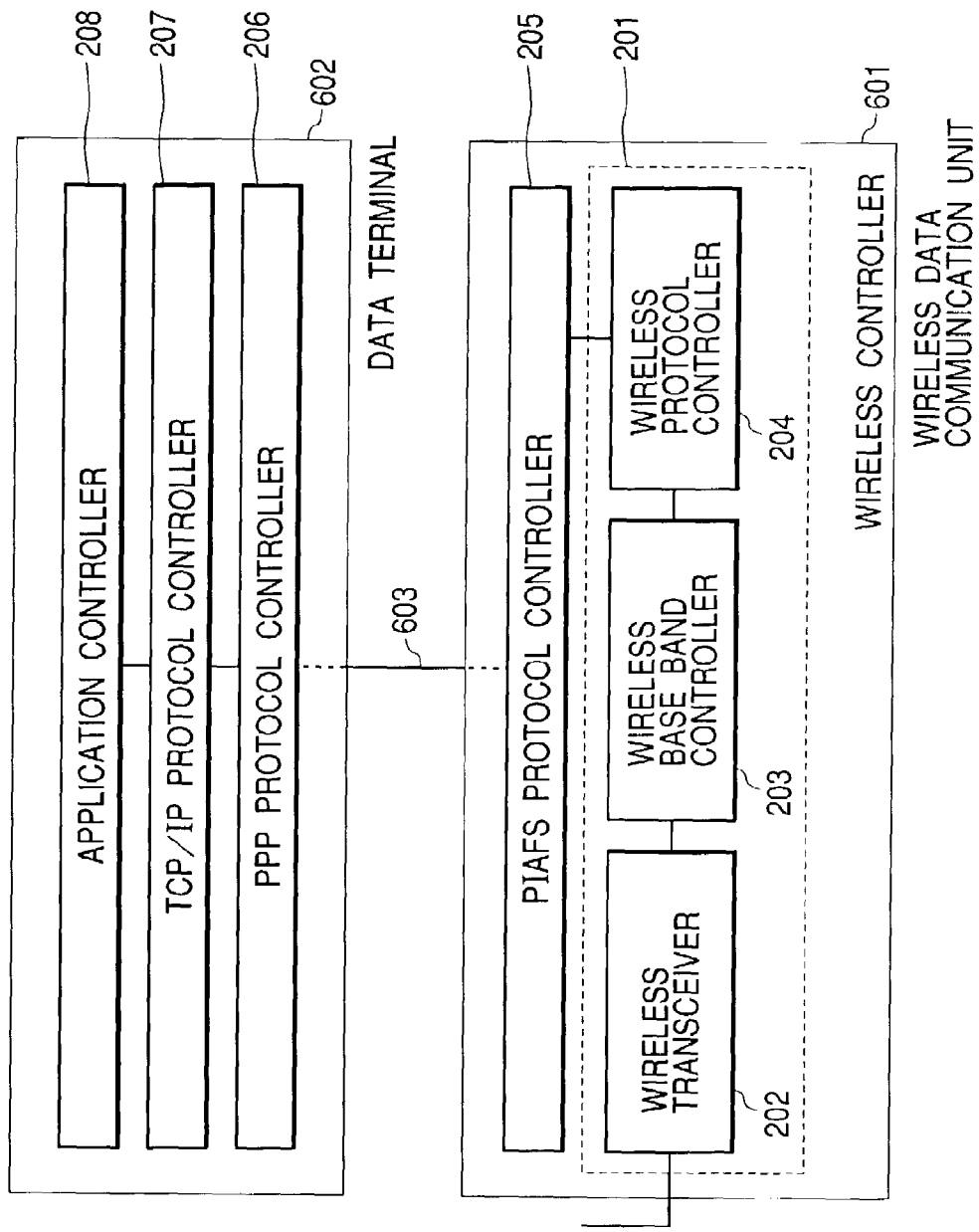
FIG. 6 is a block diagram showing a construction of a wireless data communication apparatus according to a third embodiment of the present invention.
Figure 7:
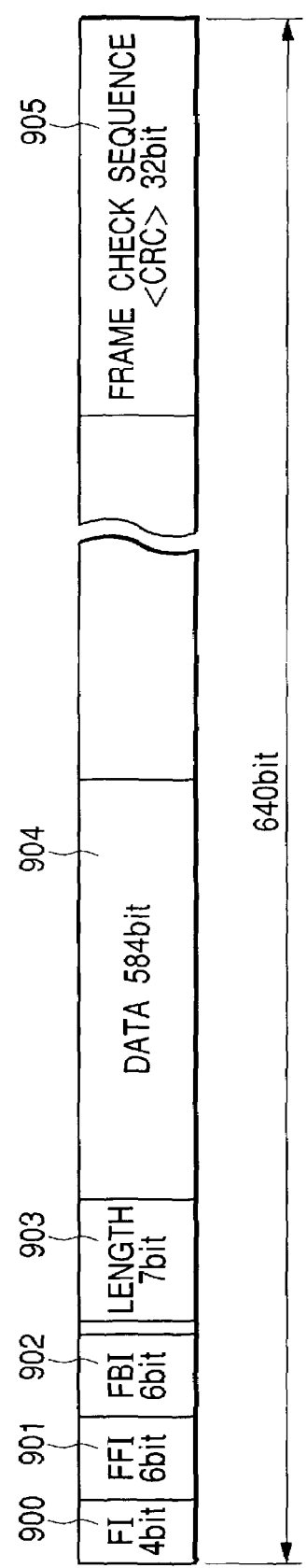
FIG. 7 is a view showing a frame format in a PIAFS data transfer protocol.
Figure 8:
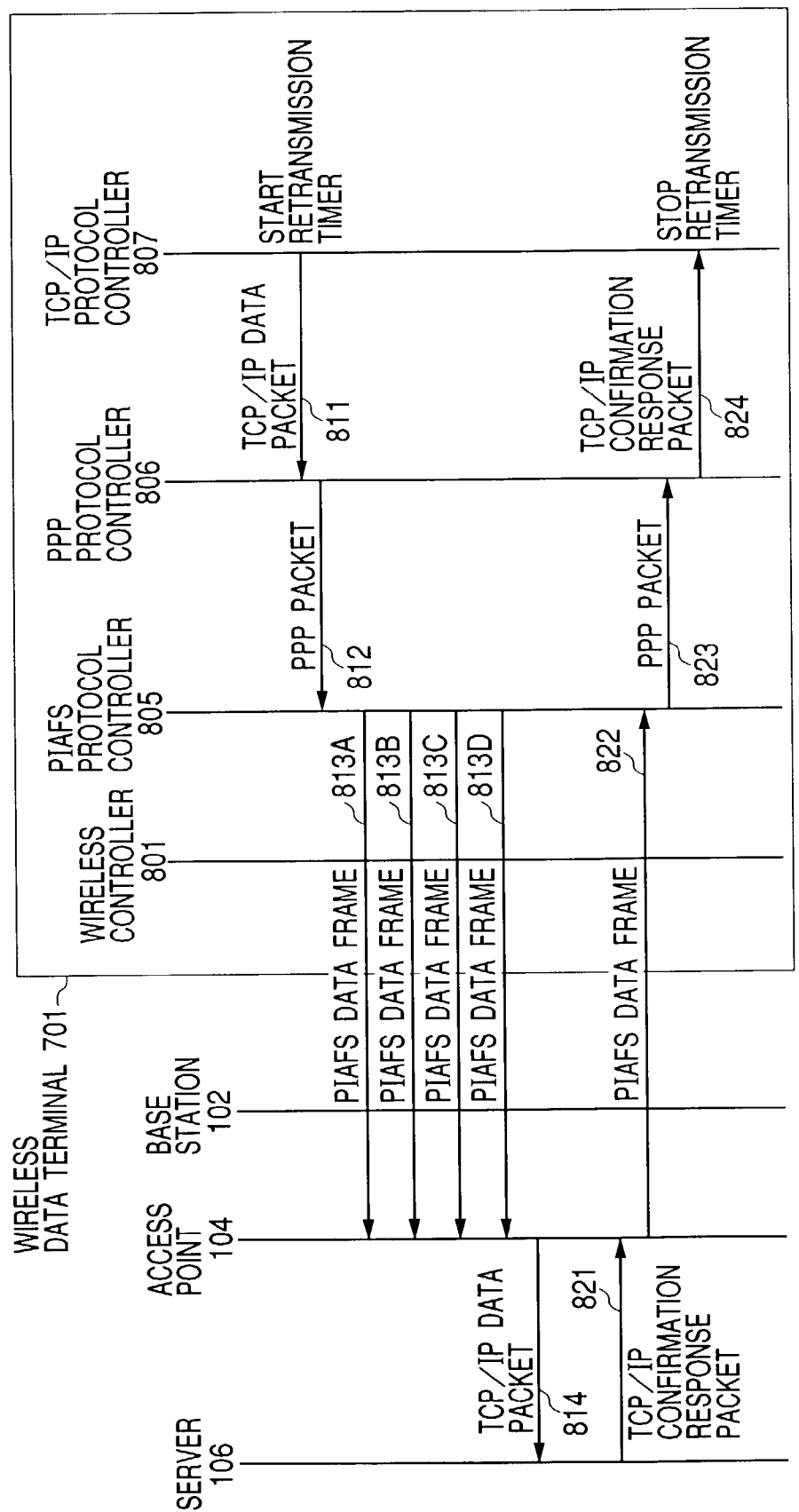
FIG. 8 is a view showing a sequence when a TCP/IP data packet is transmitted from a wireless data terminal.
Figure 9:
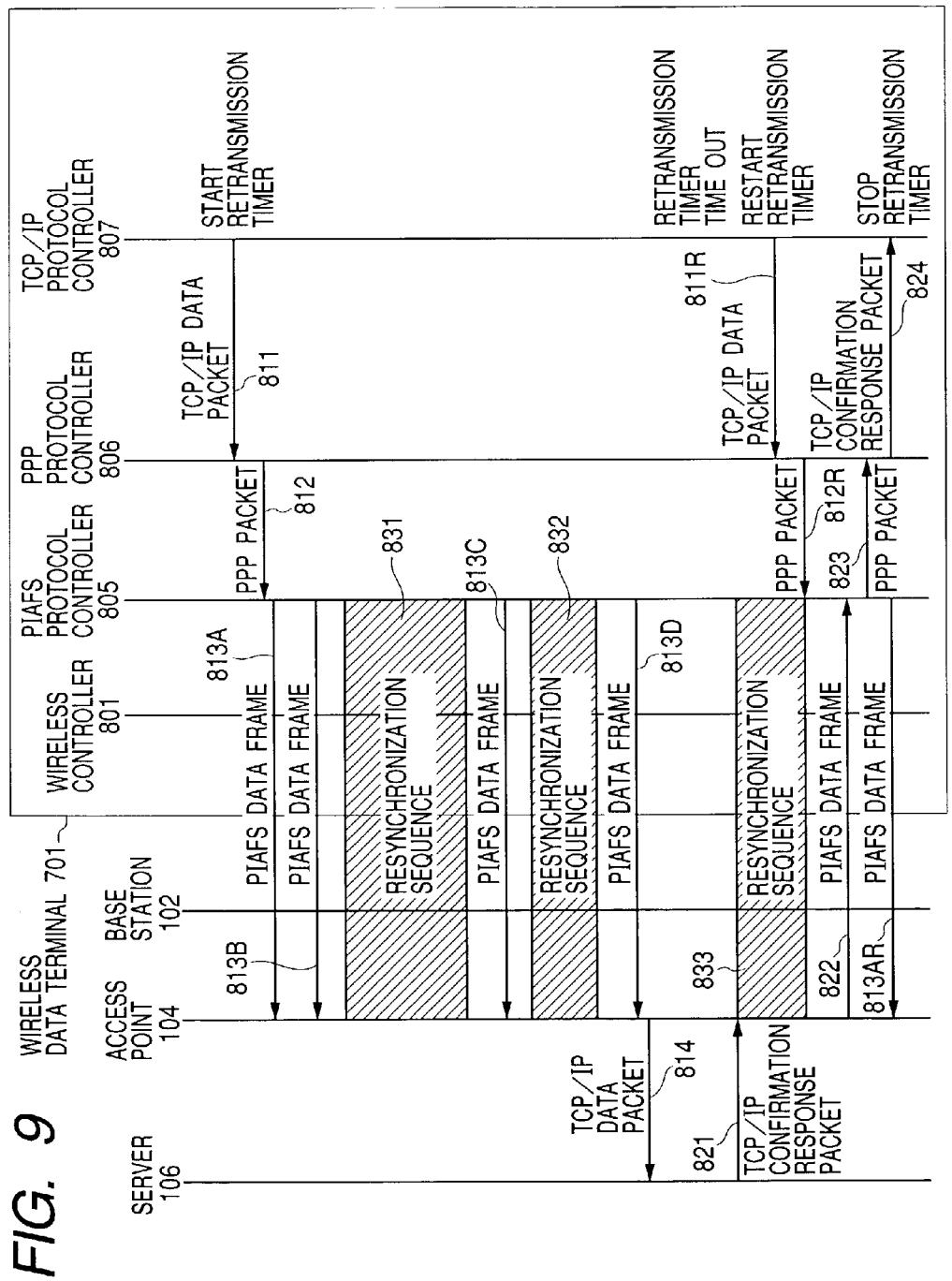
FIG. 9 is a view showing a sequence if inconvenience occurs during the transferring of the TCP/IP data in a system shown in FIG. 8.

Next, a third embodiment of the present invention will be explained with reference to FIG. 6. FIG. 6 is a block diagram showing a construction of a wireless data communication apparatus according to a third embodiment of the present invention.

As shown in FIG. 6, the wireless data communication apparatus according to the third embodiment includes a wireless data communication unit 601 and a data terminal 602, and the wireless data communication unit 601 and the data terminal 602 are interconnected via a connection cable 603. Although the connection cable 603 is typically an RS232C cable, so long as communication can be effected between the wireless data communication unit 601 and the data terminal 602, any type of cable such as a cable of connector type may be used. Further, in place of a wire communication style using such a connection cable 603, a communication style such as infrared ray communication, optical communication or a wireless communication can be used between the wireless data communication unit 601 and the data terminal 602.

The wireless data communication unit 601 includes a wireless controller 201 and a PIAFS protocol controller 205. The wireless controller 201 includes a wireless transceiver 202, a wireless base band controller 203 and a wireless protocol controller 204. The data terminal 602 includes a PPP protocol controller 206, a TCP/IP protocol controller 207 and an application controller 208 for an electronic mail, web browser and the like.

When access to the internet from the data terminal 602 through wireless communication is effected, the wireless data communication unit 601 is connected to the data terminal 602 via the connection cable 603.

According to the illustrated embodiment, in the wireless data communication unit 601, if the CRC error is detected by the PIAFS controller 205 during the transferring of the data frame, the PIAFS controller 205 starts the resynchronization sequence and informs the data terminal 602 of the starting of resynchronization. When the resynchronization is established by such resynchronization sequence, the PIAFS controller 205 informs the data terminal 602 of the completion of resynchronization through the connection cable 603.

In the data terminal 602 to which the starting of resynchronization or the completion of resynchronization was informed, the TCP/IP protocol controller 206 executes the same operation (refer to FIG. 3) as the first embodiment, and the PPP protocol controller 206 executes the same operation (refer to FIG. 5) as the second embodiment. Here, such operations will be omitted from explanation.

According to the illustrated embodiment, even when the wireless data communication unit 601 and the data terminal 602 are interconnected via the connection cable 603 and access to the internet is effected, the same effect as the first and second embodiments can be achieved. Particularly, by altering the timer processing of the TCP/IP protocol controller 207 or the PPP protocol controller 206 of the data terminal 602, a general-purpose system having a function capable of informing of the starting of resynchronization and the completion of resynchronization can be used as the wireless data communication unit 601.

While the present invention was explained in connection with preferred embodiments thereof, the present invention is not limited to the above-mentioned embodiments, but can also be applied to the access point 104 or the base station 102, and various modifications and alterations can be made within the scope of the invention.

What is claimed is:

1. A communication system comprising:
   timer means for waiting response from a recipient; and
   higher order layer protocol control means for extending said timer means, in accordance with data outputted from a lower order layer protocol controller depending upon resynchronization in a wireless data transfer protocol.

2. A system according to claim 1, wherein said higher order layer protocol control means extends said timer means in accordance with the data outputted from said lower order layer protocol controller, depending upon an error in the wireless data transfer protocol.

3. A system according to claim 1, wherein said higher order layer protocol control means has retransmission means for re-transmitting the data to the recipient after a time period for waiting the response from the recipient is elapsed.

4. A system according to claim 1, wherein said higher order layer protocol control means has interruption means for interrupting a link to the recipient after a time period for waiting the response from the recipient is elapsed.

5. A system according to claim 1, wherein said lower order layer protocol controller effects communication with respect to an access point connected via a first network, and said higher order layer protocol control means waits the response from the recipient connected said first network, said access point and a second network.

6. A communication system comprising:
   timer means for waiting response from a recipient; and
   higher order layer protocol control means for stopping said timer means, in accordance with data outputted from a lower order layer protocol controller depending upon resynchronization in a wireless data transfer protocol.

7. A communication system comprising:
   lower order layer protocol control means for controller a wireless data transfer protocol; and
   higher order layer protocol control means for extending a time period for waiting response from a recipients in accordance with data outputted from a lower order layer protocol control means depending upon resynchronization in a wireless data transfer protocol.

8. A method for controlling a higher order layer protocol, comprising the steps of:
   waiting response from a recipient; and
   extending a time period for waiting the response from the recipient, in accordance with data outputted from a lower order layer protocol controller depending upon resynchronization in a wireless data transfer protocol.

9. A method according to claim 8, wherein said extending step includes extending the time period for waiting the response from the recipient in accordance with data outputted from a wireless data transfer protocol controller, depending upon an error in the wireless data transfer protocol.

10. A method according to claim 8, wherein said waiting step includes a re-transmitting step for re-transmitting the data to the recipient after the time period for waiting the response from the recipient is elapsed.

11. A method according to claim 8, wherein said waiting step includes an interrupting step for interrupting a link to the recipient after the time period for waiting the response from the recipient is elapsed.

12. A method according to claim 8, wherein said lower layer protocol controller effects communication with respect to an access point connected via a first network, and said waiting step waits the response from the recipient connected said first network, said point and a second network.

13. A control program recorded on a computer-readable medium for controlling a higher order layer protocol, comprising the steps of:
   waiting response from a recipient; and
   extending a time period for waiting the response from the recipients, in accordance with data outputted from a lower order layer protocol controller depending upon resynchronization in a wireless data transfer protocol.

* * * * *

UNITED STATES PATENT AND TRADEMARK OFFICE
CERTIFICATE OF CORRECTION

| | | |
|---|---|---|
| PATENT NO. | : 7,151,746 B2 | Page 1 of 1 |
| APPLICATION NO. | : 10/209357 | |
| DATED | : December 19, 2006 | |
| INVENTOR(S) | : Hiroki | |

It is certified that error appears in the above-identified patent and that said Letters Patent is hereby corrected as shown below:

1. Column 10, Line 13, change "controller" to --controlling--;

2. Column 10, Line 16, change "recipients" to --recipient,--; and

3. Column 10, Line 50, change "recipients" to --recipient,--.

Signed and Sealed this

Third Day of July, 2007

JON W. DUDAS
*Director of the United States Patent and Trademark Office*